US006649849B2

(12) United States Patent
Bass et al.

(10) Patent No.: US 6,649,849 B2
(45) Date of Patent: Nov. 18, 2003

(54) HANDHELD MAILING SYSTEM

(75) Inventors: Edward R. Bass, Trumbull, CT (US); Konstantin G. Kodonas, Norwalk, CT (US); Kimberly S. Chotkowski, North Haven, CT (US); Linda S. Lin, Shelton, CT (US); Jacques E. Hasbani, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 274 days.

(21) Appl. No.: 09/873,538

(22) Filed: Jun. 4, 2001

(65) Prior Publication Data

US 2002/0183890 A1 Dec. 5, 2002

(51) Int. Cl.[7] ........................ G01G 19/413; G01G 19/40

(52) U.S. Cl. .................... 177/25.15; 177/148; 705/407; 705/416

(58) Field of Search ........................... 177/25.11, 25.12, 177/25.13, 25.14, 25.15, 25.16, 148, 149; 705/407, 416

(56) References Cited

U.S. PATENT DOCUMENTS 5,121,328 A * 6/1992 Sakai et al. ................. 705/407
5,200,903 A * 4/1993 Gilham .................... 177/25.15
5,615,120 A * 3/1997 Schwartz et al. ........... 705/407
5,657,689 A * 8/1997 Lee ............................ 705/410
5,710,706 A * 1/1998 Märkl et al. ............. 177/25.15
6,153,835 A * 11/2000 Schwartz et al. ........ 155/25.13
6,194,671 B1 * 2/2001 Vaghi ...................... 177/25.15
6,426,471 B1 * 7/2002 Gubitose ................. 177/25.15

OTHER PUBLICATIONS

Specification of U.S. patent application Ser. No. 09/833,167, titled "A System Device and Method for Recording and Input to a Programmable Stamp of Data to be Included on a Substrate in Both Human and Machine Readable Form," filed Apr. 11, 2001 (Attorney Docket # F–219).

* cited by examiner

*Primary Examiner*—Randy Gibson
(74) *Attorney, Agent, or Firm*—Brian A. Lemm; Angelo N. Charles; Charles R. Malandra, Jr.

(57) ABSTRACT

A handheld mailing system that is easily portable while still maintaining the functionality and security necessary for a complete mailing system is disclosed. A handheld device, such as, for example, a Personal Data Assistant (PDA), is provided with a rating engine and metering device functionality. The weight of an item to be mailed can be input manually, or provided via a communication link from a scale. The rating engine in the PDA will determine the necessary amount of postage, and the metering functionality will provide the authorization and funds for the necessary postage. A printer coupled to the PDA provides a printed label. A security device, such as, for example, a dongle, is provided to ensure security for the mail processing functionality.

28 Claims, 4 Drawing Sheets

HANDHELD MAILING SYSTEM

FIELD OF THE INVENTION

The invention disclosed herein relates generally to mailing systems, and more particularly to an apparatus and method for handheld mailing systems.

BACKGROUND OF THE INVENTION

Computer systems often include peripheral devices connected to a host computer system for performing various specialized functions. Such systems that include specialized peripheral devices for processing parcels, letters and other types of mail, hereinafter referred to as mail pieces, are referred to as mailing systems. As illustrated in FIG. 1, a conventional mailing system 10 includes a host computer 12, which can be an industry-standard personal computer, workstation or the like having a keyboard and monitor and possibly other input/output devices such as a mouse. Mailing system 10 further includes a scale 14 for weighing mail pieces, a metering device 16 for dispensing appropriate postage, and a printer 18 for printing indicia of the proper postage on a label or envelope of the mail pieces. Scale 14, metering device 16 and printer 18 are coupled to the host computer 10 through peripheral management device 20.

To prepare a mail piece for mailing using the conventional system 10 as illustrated in FIG. 1, the user must place the mail piece on the scale 14 for weighing. Software executing on the host computer 12 provides a user interface, as well as database management, bookkeeping, and reporting capabilities. For example, accounting routines in the software can keep track of how much postage has been used in the mailing system. Scale 14 includes a rating engine that determines the amount of postage necessary based on the weight of the mail piece. This information is provided to host computer 12, which then communicates with meter 16. Meter 16 will determine if sufficient postage is available for the current transaction, and if so, will deduct the amount of postage to be dispensed and provide host computer 12 authorization to print a postage label. Printer 18, based on signals from host computer 12, will print a label with the appropriate postage to affix to the mail piece (or print the postage directly on a mail piece).

There are drawbacks, however, with the conventional mailing system as illustrated in FIG. 1. As noted above, the system 10 includes several different peripheral devices, each of which must be compatible and maintained, adding to the cost and complexity of the system 10. Additionally, due to the number of peripheral devices and size of each peripheral device, it is not possible to easily move the system 10 from one location to another. Accordingly, the system 10 is typically stationary and any mail to be processed must be brought to the system 10.

Another requirement for system 10 is ensuring its security from fraud. Since system 10 is capable of printing indicia bearing monetary value, it is necessary to provide sufficient security for the system 10 to prevent tampering with the system, and specifically meter 16, to prevent the fraudulent usage of funds. Accordingly, meter 16 must be secure and the communications between the several devices in the system must be secure, thereby adding to the cost and complexity of the system.

Thus, there exists a need for a mailing system that is compact enough to be portable but can still provide the necessary functionality and security of a conventional mailing system.

SUMMARY OF THE INVENTION

The present invention alleviates the problems associated with the prior art and provides a handheld mailing system that is easily portable while still maintaining the functionality and security necessary for a complete mailing system.

In accordance with the present invention, a handheld device, such as, for example, a Personal Data Assistant (PDA), is provided with a rating engine and metering device functionality. The weight of an item to be mailed can be input manually, or provided via a communication link to a scale. The rating engine in the PDA will determine the necessary amount of postage, and the metering functionality will provide the authorization and funds for the necessary postage. A printer coupled to the PDA provides a printed label. A security device, such as, for example, a dongle, is provided to ensure security for the mail processing functionality.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
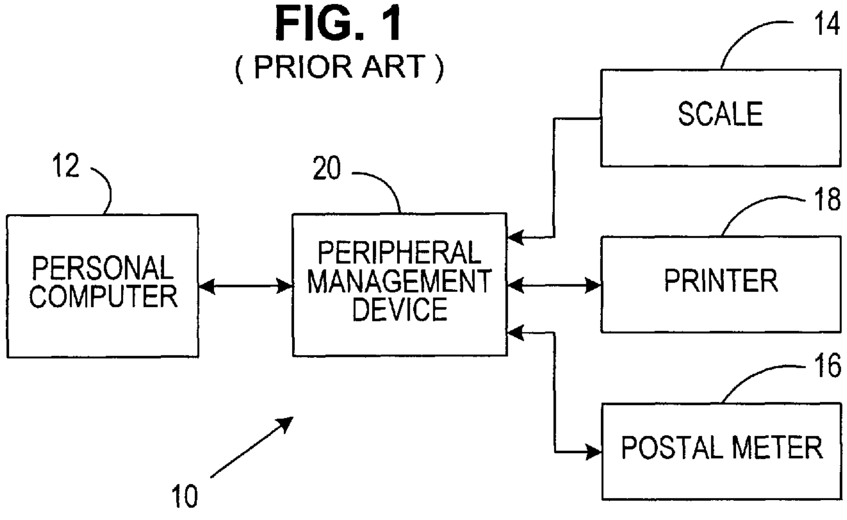
FIG. 1 ( PRIOR ART )
FIG. 1 illustrates in block diagram form a conventional mailing system.
Figure 2:
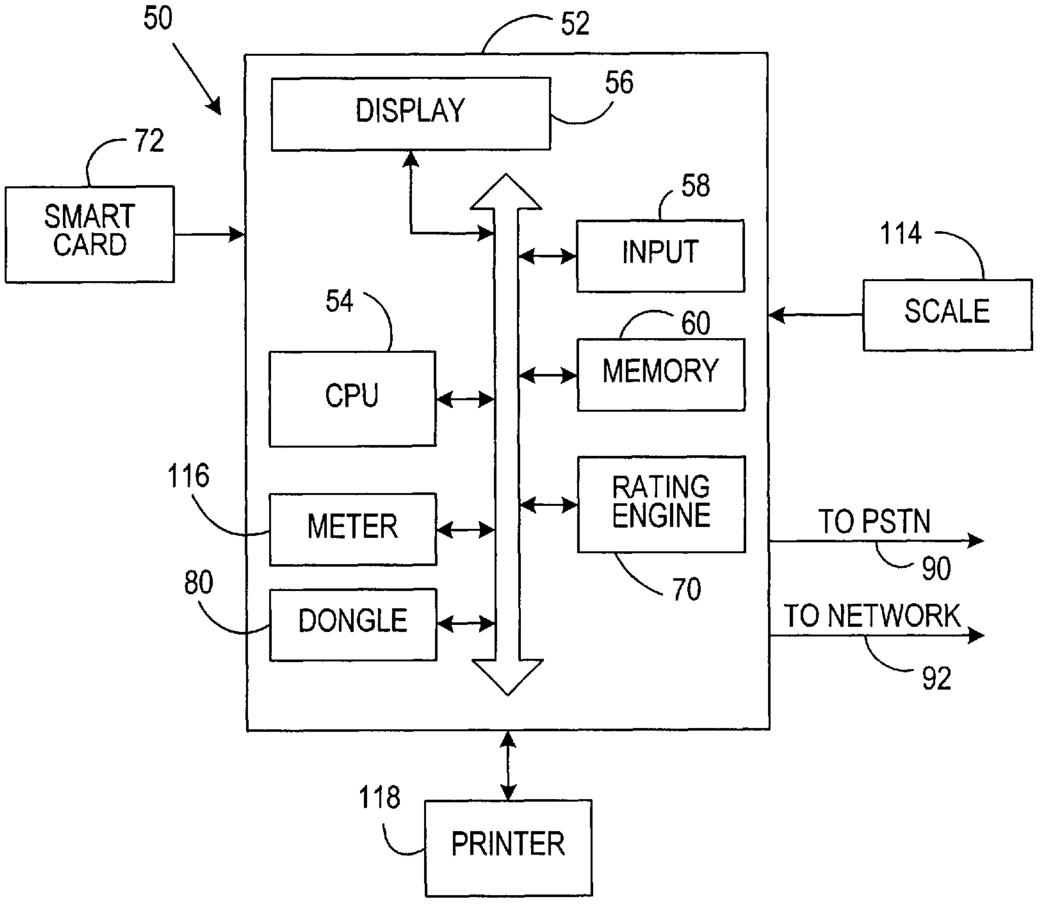
FIG. 2 illustrates in block diagram form a portable mailing system according to the present invention.

In describing the present invention, reference is made to the drawings, wherein there is seen in FIG. 2 a portable mailing system 50 according to the present invention. Portable mailing system 50 includes a handheld device 52, such as, for example, a Personal Digital Assistant (PDA), having a central processing unit (CPU) 54; a storage device 60, such as, for example, a memory; a display 56; and an input device 58. Input device 58 may be, for example, a keyboard or scratchpad type device. CPU 54 is operatively coupled to display 56 and input 58 for the passage of signals used to operate and control the handheld device 52.

In accordance with the present invention, handheld device 52 is also provided with a meter function 116 and a rating engine 70. Meter 116 stores the currently available funds amount and is used by a meter routine in conjunction with CPU 54 to track and account for postage expended by device 52 to frank mail pieces. In accordance with the present invention, the updating of the funds in meter 116 can be accomplished in several ways as will be further described below. Rating engine 70 is used to determine the amount of postage required for a mail piece based on the weight of the mail piece and the class of service selected for that mail piece. In accordance with the present invention, rating engine 70 can also be updated as will be further described below. A printer 118 can be operatively coupled to device 52 for printing address labels for mail pieces and printing indicia of the proper postage. Device 52 is further provided with a port for a communication link 90 to a Public Switched Telephone Network (PSTN) and a port for a communication link 92 to a network, such as, for example, the Internet.

Since device 52 is capable of printing indicia bearing monetary value, a security device 80, such as, for example, a dongle, is provided to prevent tampering with the system and ensure accurate calculation of postage by rating engine 70 and accounting of the funds stored in meter 116 and printed by printer 118. A dongle is a hardware key coupled to an input/output port of a host computer that will provide access to software code in the host computer only if specified dongle access codes are provided. Such coupling may be either a hard wired connection or a wireless connection. Accordingly, dongle 80 will prevent unauthorized access to the rating engine 70 and meter 116, thereby preventing tampering with their functionality, i.e., rate calculation and funds stored therein. Additionally, since system 50 is an open system, i.e., printer 118 is not dedicated solely to the metering activity, it is necessary to secure the indicia printed by printer 118. Such security can be provided, for example, by including addressee information in the indicia and encrypting the indicia printed on the mail piece for subsequent verification. Accordingly, system 50 can be provided with secret keys used for encryption of the indicia prior to printing on a mail piece. Such secret keys can be stored, for example, in dongle 80 during manufacturing of system 50.

Figure 3:
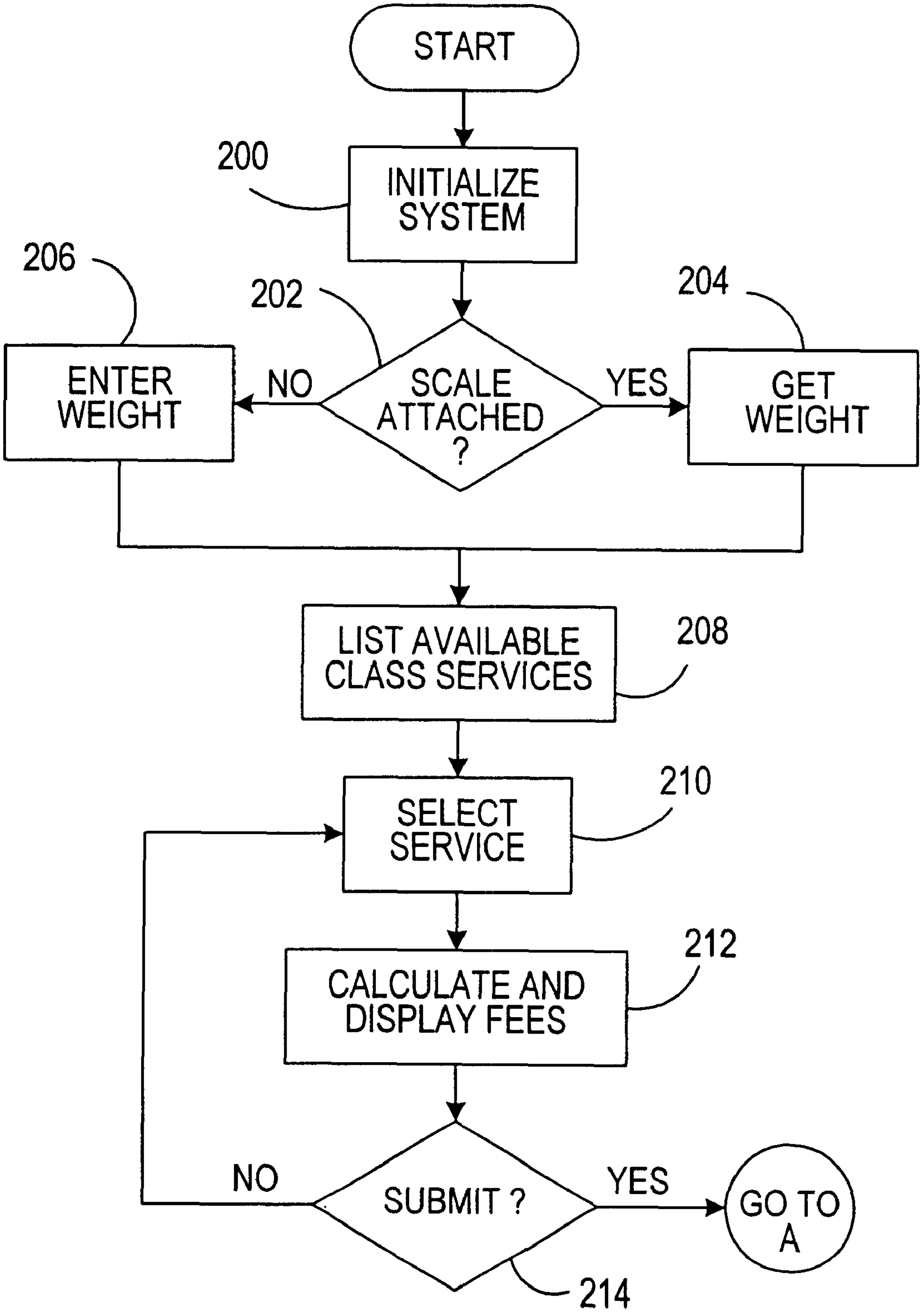
FIG. 3 illustrates in flow chart form the operation of the portable mailing system according to the present invention.

The operation of device 52 will be described with respect to the flow charts illustrated in FIGS. 3–5. Referring now to FIG. 3, when a user desires to use the system 50 to produce a mailing label or postage indicia for a mail piece, the process begins at step 200 where an initialization of the system 50 occurs. At step 202, it is determined if a scale 114 is attached to the device 52. Scale 114 can be coupled to device 52 either through a physical connection, such as a removable cable assembly via a port in device 52; alternatively, scale 114 can be coupled to device 52 via a wireless transmission link, such as, for example, an infrared link. If it is determined in step 202 that a scale 114 is attached, in step 204 the weight of the mail piece is provided from scale 114 to device 52. If it is determined in step 202 that a scale is not coupled to device 52, in step 206 the weight of the mail piece is entered utilizing the input 58 of device 52.

In step 208, the available class of services, such as, for example, first class, bulk rate, overnight delivery, etc. are listed on the display 56 of device 52. Additionally, a list of other value-added services, such as, for example, insurance, return receipt, etc., will be listed on display 56. In step 210, the user will select the services desired for the mail piece using the input 58 of device 52. In step 212, the fees for the mail piece will be calculated by rating engine 70 based on the services selected in step 210 and will be displayed on display 56 of device 52. In step 214, the user is queried as to whether or not the current transaction should be submitted to the meter 116. If in step 214 it is determined that the current transaction should not be submitted, the process returns to step 210 for the user to re-select the services desired for the mail piece.

Figure 4:
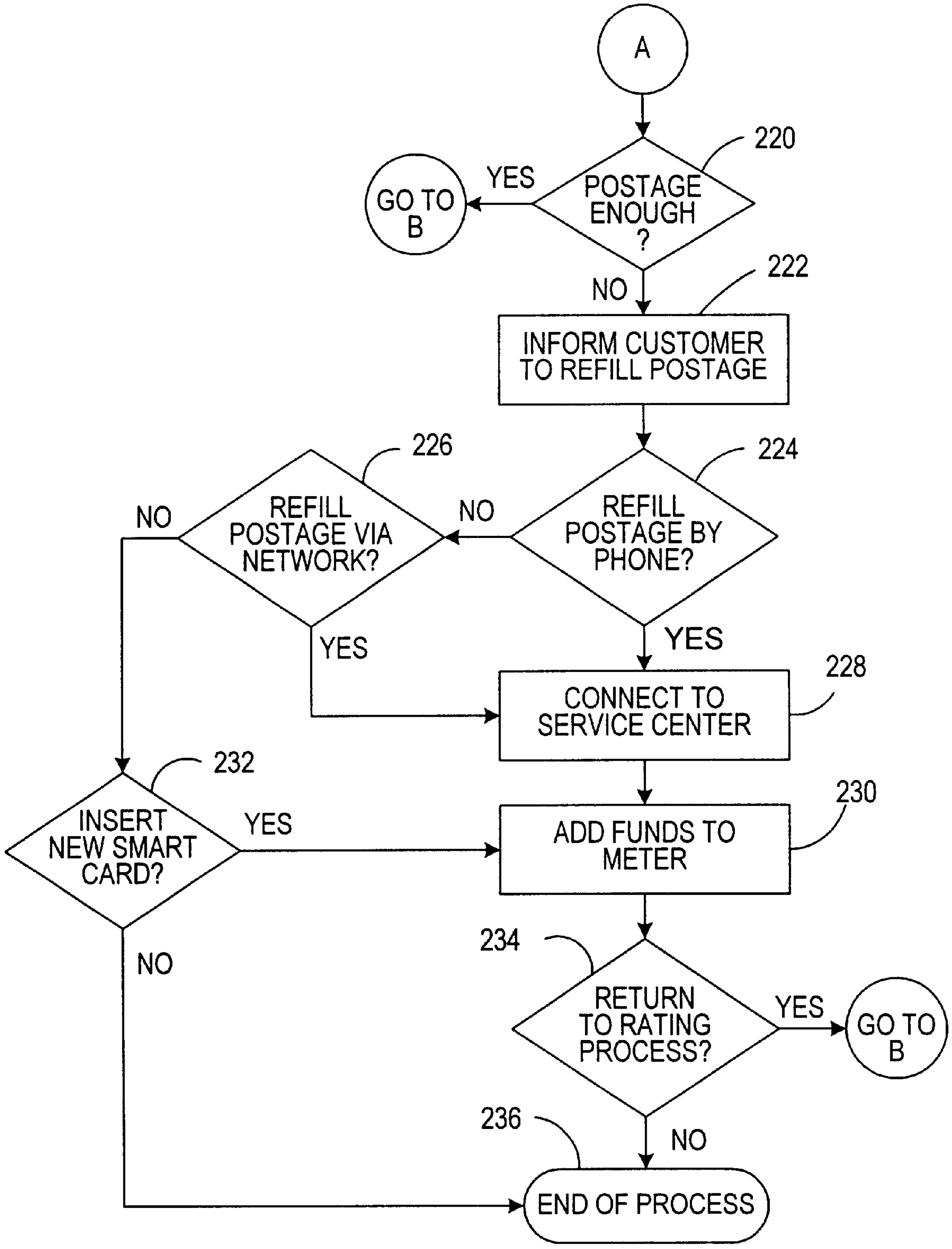
FIG. 4 illustrates in flow chart form further operation of the portable mailing system according to the present invention.

In step 214 if it is determined that the current transaction should be submitted, referring now to FIG. 4 then in step 220 it is determined if the amount of funds currently stored in meter 116 are sufficient to cover the current transaction. If the amount of funds stored in meter 116 are not sufficient to cover the current transaction, in step 222 the user is informed that the funds in meter 116 must be refilled. In step 224, the user is queried if the refill function will be performed via a telephone line. If the refill function will occur by telephone line, then in step 228 device 52 connects to a service center via communication link 90 through a PSTN. Alternatively, the connection to a service center in step 228 can also be done via a wireless communication. Once the link to a service center has been accomplished, in step 230 funds are added to meter 116. It should be noted that a security device, such as dongle 80, is utilized to ensure that the refilling of funds in step 230 is performed securely and all funds are accurately accounted for.

If in step 224 it is determined the refill of funds in meter 116 will not occur via telephone, in step 226 it is determined if the refill will occur via connection to a network, such as, for example, the Internet. If in step 226 it is determined that refill of meter 116 will occur via a network, then in step 228 a connection is made to the service center through the network via communication link 92, and funds are added to meter 116 in step 230. Alternatively, the communication link to the network could also be done via a wireless connection. If in step 226 it is determined that a network communication will not be used, then in step 232 it is determined if the refill will occur utilizing a smart card. A smart card is an integrated circuit device that includes a processor and associated memory that can store information. Smart card 72 can be provided with funds, and when inserted into or otherwise coupled to device 52, the funds stored in smart card 72 can be transferred to meter 116. If in step 232 it is determined a smart card will be used, then in step 230 the smart card is coupled to device 52 and the funds in meter 116 are refilled. It should be noted that a security device, such as dongle 80, is utilized to ensure that the refilling of funds in step 230 is performed securely and all funds are accurately accounted for.

If in step 232 it is determined that refill will not occur via a smart card, then in step 236 the process will end, as the amount of funds in meter 116 will be insufficient to complete the transaction for the mail piece.

It should be noted that any necessary updating of rating engine 70 can also occur by any of the methods described above for refilling the meter 116. Thus, if postal rates change or additional services are offered, rating engine 70 can be updated via a telephone link, smart card, or network connection.

Returning again to FIG. 4, if funds have been added to meter 116 in step 230, then in step 234 it is determined if the user wishes to return to the rating process. If the user does not wish to return to the rating process, then in step 236 the process ends.

Figure 5:
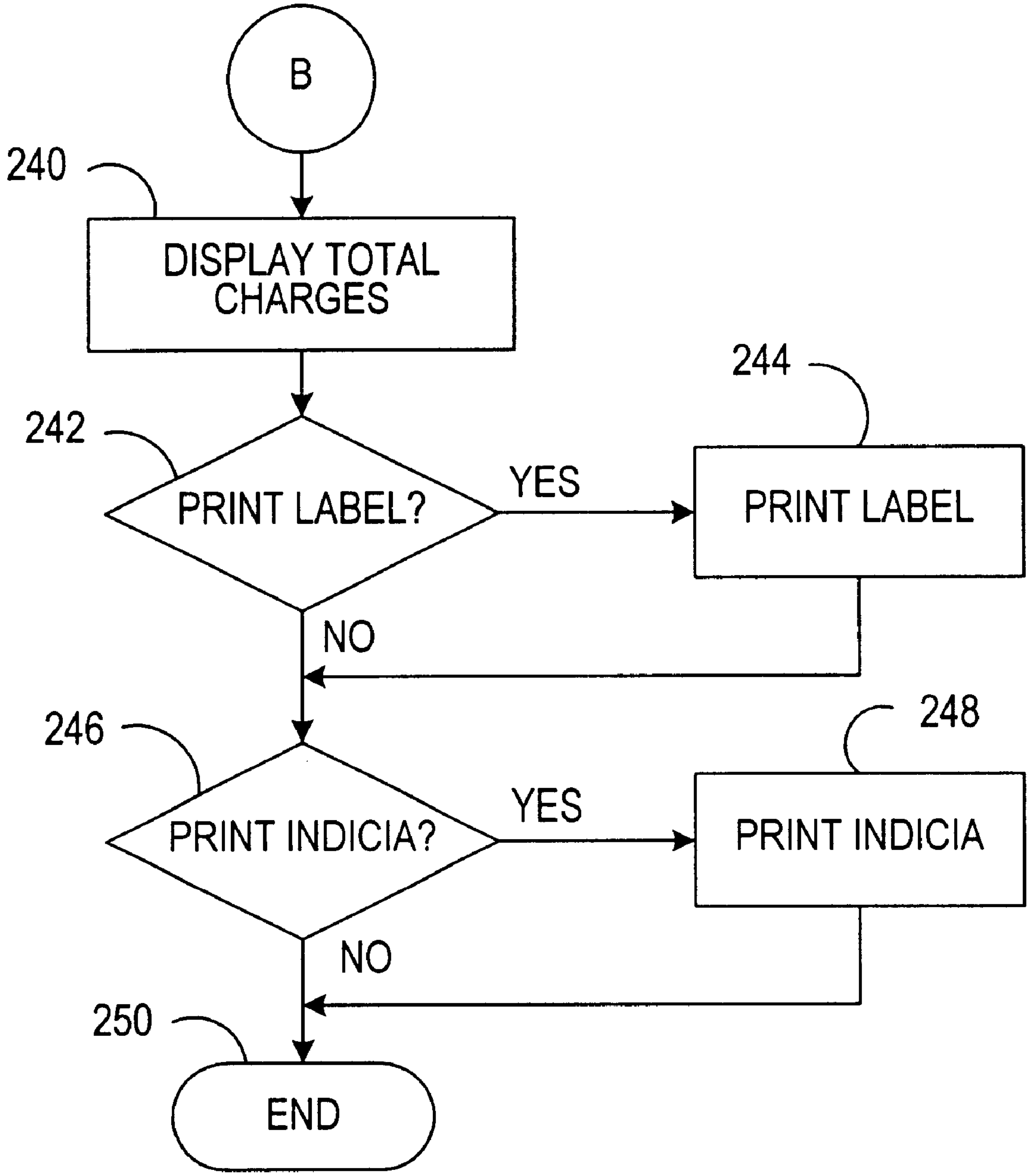
FIG. 5 illustrates in flow chart form further operation of the portable mailing system according to the present invention.

If it is determined in step 220 that the amount of funds currently stored in meter 116 are sufficient to cover the current transaction or if the user does wish to return to the rating process in step 234, then in FIG. 5 in step 240 the total charges for the current transaction, based upon the services selected by the user in step 210 and the weight of the mail piece provided in step 204 or 206, is displayed on display 56. The user is then queried in step 242 as to whether or not a label, such as, for example, a destination address label or an origination address label is to be printed. If a label is to be printed, then in step 244 the information is input, via input device 58, and the label or labels are printed utilizing printer 118. Alternatively, information for one or more of the labels can be obtained from memory 60 of device 52.

Once printing of the label(s) in step 244 is complete, or if it is determined in step 242 that no labels are to be printed, then in step 246 it is determined if indicia, i.e., a postage label, is to be printed. If a postage label is to printed, then in step 248 the indicia is printed utilizing printer 118 under the control of meter 116, and the funds in meter 116 are decremented accordingly. Once printing of the indicia in step 248 is complete, or if it is determined in step 246 that no indicia is to be printed, then in step 250 the process ends.

Thus, in accordance with the present invention, a handheld mailing system that is easily portable while still maintaining the functionality and security necessary for a complete mailing system is provided.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A portable mailing system comprising:

a handheld device including an embedded rating engine and a meter function, said meter function storing funds for postage;

a scale operatively coupled to said handheld device;

a printer operatively coupled to said hand held device; and a security device coupled to said handheld device to prevent unauthorized access to said rating engine and said meter function, wherein said scale provides a weight of a mail piece to said handheld device, said rating engine determines a postage amount for said mail piece based on said weight and a selected service, and said meter function accounts for said postage amount from said stored funds for postage and utilizes said printer to print indicia bearing said postage amount.

2. The system according to claim 1, wherein said scale is operatively coupled to said handheld device by a wireless link.

3. The system according to claim 1, wherein said scale is operatively coupled to said handheld device by a removable cable.

4. The system according to claim 1, wherein said selected service includes class of mail.

5. The system according to claim 1, wherein said handheld device further includes a display to display said determined postage amount.

6. The system according to claim 1, wherein said security device is a dongle.

7. The system according to claim 1, wherein said handheld device further includes a communications port for connection to a service center to refill said funds stored in said meter function.

8. The system according to claim 7, wherein said handheld device is further adapted to use said communications port to update said rating engine.

9. The system according to claim 7, wherein said connection to said service center is via a telephone line.

10. The system according to claim 7, wherein said connection to said service center is via a network.

11. The system according to claim 1, wherein said handheld device is adapted to refill said funds via a smart card.

12. The system according to claim 1, wherein said handheld device further comprises an input device, and said weight of said mail piece is input to said handheld device via said input device.

13. A portable mailing system comprising:

a handheld device, the handheld device including:

a central processing unit;

a rating engine operatively coupled to said central processing unit, said rating engine to determine a postage amount for a mail piece based on a weight of said mail piece and a selected service for said mail piece;

a meter function operatively coupled to said central processing unit, said meter function to store and distribute funds for postage; and a security device to prevent unauthorized access to said rating engine and said meter function, wherein when said weight of a mail piece is provided to said handheld device, said rating engine determines a postage amount for said mail piece based on said weight and said selected service, and said meter function authorizes said postage amount and deducts funds for said postage amount from said funds stored in said meter function.

14. The portable mailing system according to claim 13, said handheld device further comprising:

a display operatively coupled to said central processing unit to display said postage amount for said mail piece.

15. The portable mailing system according to claim 13, said handheld device further comprising:

an input device operatively coupled to said central processing unit to input said weight of said mail piece.

16. The portable mailing system according to claim 13, wherein said security device is a dongle.

17. The portable mailing system according to claim 13, said handheld device further comprising:

a communications port for connection to a service center to refill said funds stored in said meter function.

18. The portable mailing system according to claim 17, wherein said communications port is used to update said rating engine.

19. The portable mailing system according to claim 17, wherein said connection to said service center is via a telephone line.

20. The portable mailing system according to claim 17, wherein said connection to said service center is via a network.

21. The portable mailing system according to claim 13, said handheld device further comprising:

a port for a smart card, wherein said handheld device is adapted to refill said funds via said smart card.

22. The portable mailing system according to claim 13, further comprising:

a printer operatively coupled to said central processing unit to print indicia bearing said determined postage amount.

23. The portable mailing system according to claim 22, wherein said printer is further adapted to print a label.

24. The portable mailing system according to claim 13, wherein said weight is provided to said handheld device by a scale.

25. The portable mailing system according to claim 24, wherein said scale provides said weight of said mail piece to said handheld device via a removable cable.

26. The portable mailing system according to claim 24, wherein said scale provides said weight of said mail piece to said handheld device via a wireless link.

27. The portable mailing system of claim 1, wherein the handheld device is a personal data assistant.

28. The portable mailing system of claim 13, wherein the handheld device is a personal data assistant.

* * * * *